(12) United States Patent
Barrett et al.

(10) Patent No.: US 8,103,930 B2
(45) Date of Patent: *Jan. 24, 2012

(54) APPARATUS FOR IMPLEMENTING PROCESSOR BUS SPECULATIVE DATA COMPLETION

(75) Inventors: Wayne Melvin Barrett, Rochester, MN (US); Philip Rogers Hillier, III, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 911 days.

This patent is subject to a terminal disclaimer.

(21) Appl. No.: 12/127,118

(22) Filed: May 27, 2008

(65) Prior Publication Data

US 2008/0222489 A1    Sep. 11, 2008

Related U.S. Application Data

(63) Continuation of application No. 11/116,624, filed on Apr. 28, 2005, now Pat. No. 7,426,672.

(51) Int. Cl.
*H03M 13/00* (2006.01)
(52) U.S. Cl. ........................................ 714/753
(58) Field of Classification Search .......... 714/746, 714/753, 763, 764
See application file for complete search history.

(56) References Cited

U.S. PATENT DOCUMENTS

| 4,112,502 A |   | 9/1978  | Scheuneman |         |
|-------------|---|---------|------------|---------|
| 4,375,664 A |   | 3/1983  | Kim        |         |
| 4,523,313 A | * | 6/1985  | Nibby et al. | 714/710 |
| 5,488,691 A |   | 1/1996  | Fuoco et al. |       |
| 5,502,732 A | * | 3/1996  | Arroyo et al. | 714/746 |
| 5,504,859 A |   | 4/1996  | Gustafson et al. |  |
| 5,555,250 A | * | 9/1996  | Walker et al. | 714/763 |
| 5,604,753 A | * | 2/1997  | Bauer et al. | 714/763 |
| 5,781,918 A |   | 7/1998  | Lieberman et al. | |
| 6,003,114 A |   | 12/1999 | Bachmat    |         |
| 6,311,286 B1|   | 10/2001 | Bertone et al. |     |
| 6,832,340 B2|   | 12/2004 | Larson et al. |      |
| 7,493,549 B2| * | 2/2009  | Nicolaidis | 714/763 |

FOREIGN PATENT DOCUMENTS

JP    58057700 A    4/1983
JP    2002333977 A    11/2002

* cited by examiner

*Primary Examiner* — Shelly A Chase
(74) *Attorney, Agent, or Firm* — Joan Pennington

(57) ABSTRACT

A method, and apparatus are provided for implementing processor bus speculative data completion in a computer system. A memory controller in the computer system sends uncorrected data from a memory to a processor bus. The memory controller also applies the uncorrected data to error correcting code (ECC) checking and correcting circuit. When a single bit error (SBE) is detected, corrected data is sent to the processor bus a predefined number of cycles after the uncorrected data.

5 Claims, 6 Drawing Sheets

APPARATUS FOR IMPLEMENTING PROCESSOR BUS SPECULATIVE DATA COMPLETION

This application is a continuation application of Ser. No. 11/116,624 filed on Apr. 28, 2005.

FIELD OF THE INVENTION

The present invention relates generally to the data processing field, and more particularly, relates to a method, and apparatus for implementing processor bus speculative data completion during a memory read for enabling reduced read memory latency in a computer system.

DESCRIPTION OF THE RELATED ART

In computer systems, an ongoing design goal in developing future computer systems is providing improved performance. The performance of a computer server is one of the key reasons a customer may or may not choose to buy a given system.

One of the key benchmarks server customers use is the benchmark TPC-C. Depending on the processor's cycles per instruction (CPI), the memory CPI can account for more than 50% of the overall CPI. The read memory latency has a direct impact on server performance.

A need exists for an effective mechanism for improving performance in computer systems. It is desirable to provide such a mechanism that enables reduced read memory latency while maintaining effective single bit error (SBE) detection and correction.

SUMMARY OF THE INVENTION

Principal aspects of the present invention are to provide a method, apparatus and computer program product for implementing processor bus speculative data completion in a computer system. Other important aspects of the present invention are to provide such method and apparatus for implementing processor bus speculative data completion in a computer system substantially without negative effect and that overcome many of the disadvantages of prior art arrangements.

In brief, a method, and apparatus are provided for implementing processor bus speculative data completion in a computer system. A memory controller in the computer system sends uncorrected data from a memory to a processor bus. The memory controller also applies the uncorrected data to error correcting code (ECC) checking and correcting circuit. When a single bit error (SBE) is detected, corrected data is sent to the processor bus a predefined number of cycles after the uncorrected data.

In accordance with features of the invention, sending the uncorrected data reduces latency of data transfers by at least one cycle, while providing effective SBE checking and correction.

In accordance with features of the invention, a memory controller memory management unit (MMU) in the computer system implements methods for processor bus speculative data completion. Memory controller MMU includes a multiplexer, an error correcting code (ECC) checking and correcting circuit, and a control logic function coupled to the multiplexer. Uncorrected data from the memory is applied to a first input of the multiplexer and corrected data from the ECC checking and correcting circuit is applied to a second input of the multiplexer. Normally an output of the multiplexer is the uncorrected data from the memory. When a Single Bit Error (SBE) is detected, the ECC checking and correcting circuit applies a signal to the control logic function. The control logic function applies a control signal to the multiplexer responsive to the detected Single Bit Error (SBE) for the multiplexer to select the corrected data signal at the second multiplexer input for output of the multiplexer. The output of the multiplexer is sent to the processor bus.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Figure 1:
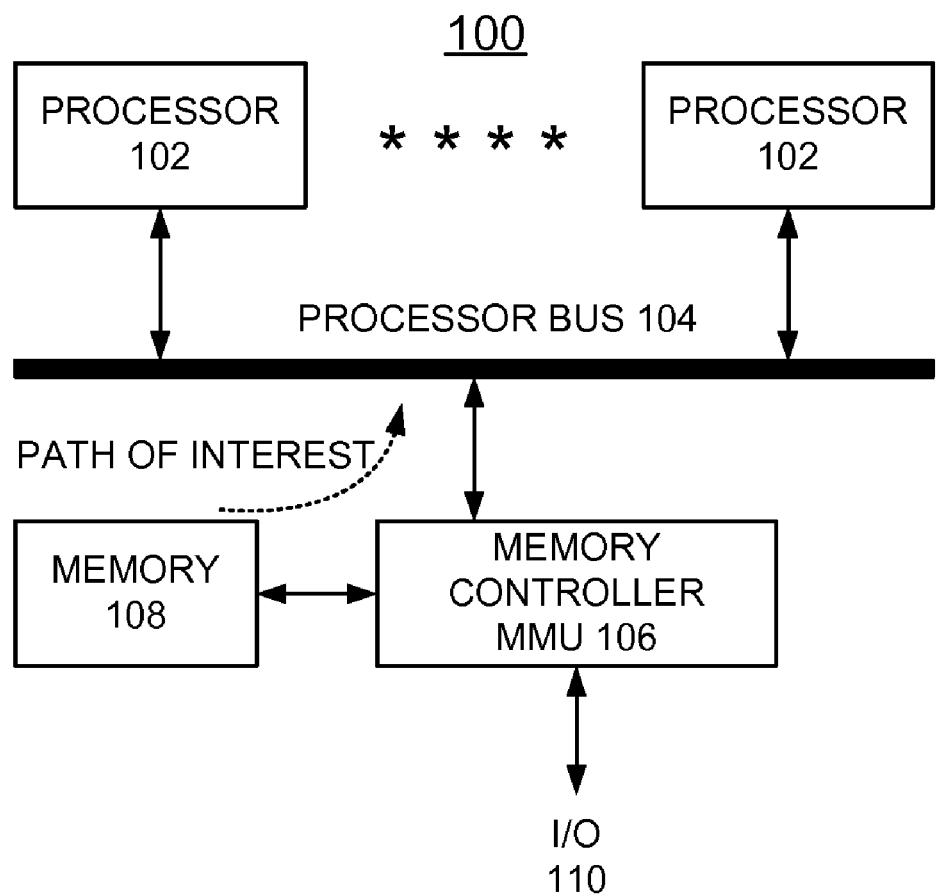
FIG. 1 is a block diagram representations illustrating a computer system for implementing methods for processor bus speculative data completion in accordance with the preferred embodiment.

Referring now to the drawings, in FIG. 1 there is shown a computer system generally designated by the reference character 100 for implementing methods for processor bus speculative data completion in accordance with the preferred embodiment. Computer system 100 includes a plurality of main processors 102 coupled by a processor bus 104 to a memory controller or memory management unit (MMU) 106. A system memory 108 and input/output (I/O) 110 is coupled to the processor bus 104 by the memory controller MMU 106. A dotted line labeled PATH OF INTEREST illustrates a data path from the system memory 108 to the processor bus 104 for implementing processor bus speculative data completion in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, a single main processor could be used.

In accordance with features of the preferred embodiment, the memory controller 106 is provided for implementing methods for processor bus speculative data completion in accordance with the preferred embodiment. The memory controller 106 sends the uncorrected data directly to the processor bus logic, providing improved performance over prior art arrangements.

Figure 2:
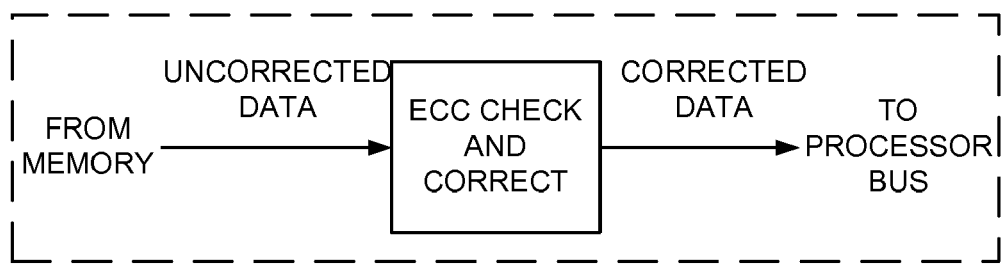
FIG. 2 illustrates a conventional memory controller arrangement.

For example, as illustrated in FIG. 2, in prior art arrangements the memory read data return is applied to a memory controller single bit error correct logic before being sent to the processor interface. This latency is added regardless of whether or not a single bit error (SBE) occurred.

In accordance with features of the preferred embodiment, in parallel with sending uncorrected data directly to the processor bus logic, the memory controller MMU 106 determines if a single bit error (SBE) occurred and indicates this to the processor bus. Because returning a cache line of data takes multiple cycles or beats on both the memory and processor bus, scenarios must be handled where the first beats are good, but a subsequent beat includes an SBE. If an SBE occurs, then on the data interface between the memory controller and processor bus corrected data is sent a predefined number of cycles after the uncorrected data, such as 2 cycles later.

Figure 3:
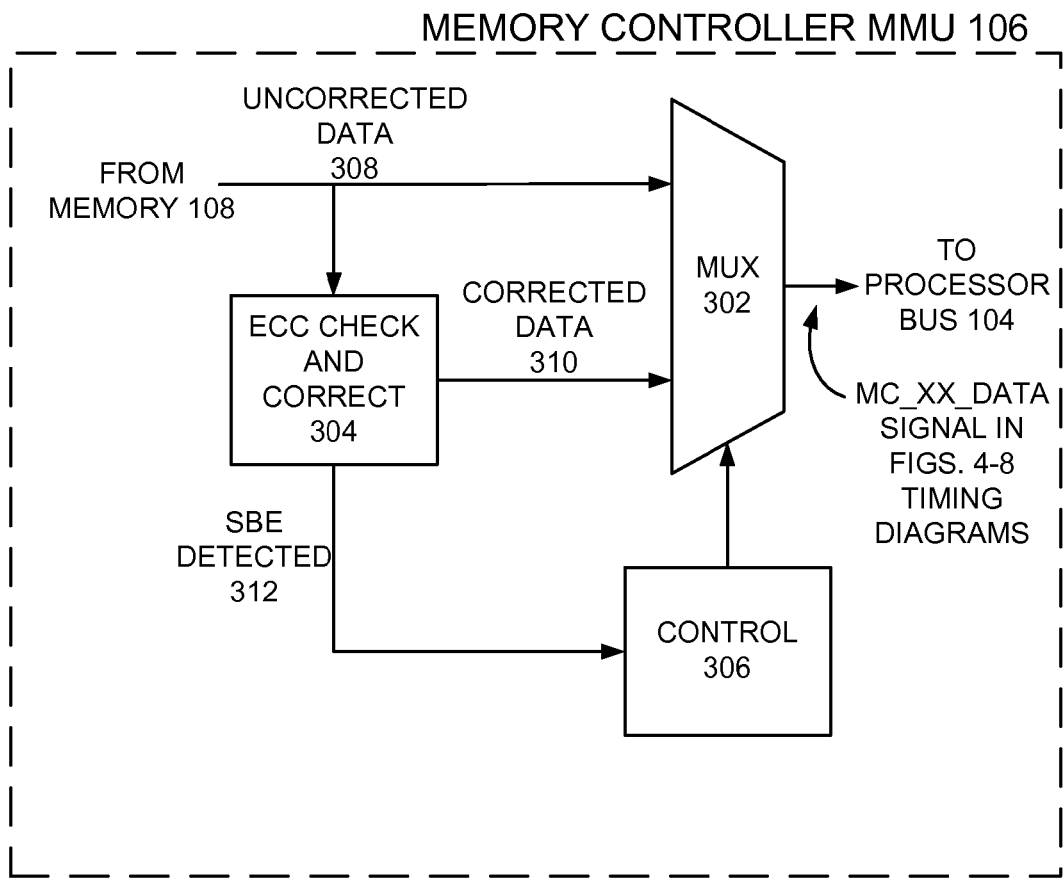
FIG. 3 illustrates a memory controller of the computer system of FIG. 1 for implementing methods for processor bus speculative data completion in accordance with the preferred embodiment.

Referring to FIG. 3, there is shown the memory controller MMU 106 of the computer system 100 for implementing methods for processor bus speculative data completion in accordance with the preferred embodiment. Memory controller MMU 106 includes a multiplexer (MUX) 302, an error correcting code (ECC) checking and correcting circuit 304, and a control logic function 306 coupled to the MUX 302. Uncorrected data from the memory 108 is applied to a first input of MUX 302 as indicated at a line UNCORRECTED DATA 308 and corrected data from the ECC checking and correcting circuit 304 is applied to a second input of MUX 302 as indicated at a line CORRECTED DATA 310. When a Single Bit Error (SBE) is detected, the ECC checking and correcting circuit 304 applies a signal to the control logic function 306 as indicated at a line SBE DETECTED 312. The output of MUX 302 is sent to the processor bus 104 as indicated at a line MC_XX_DATA SIGNAL, as shown in the timing diagrams of FIGS. 4-8.

Typically the MC_XX_DATA signal is the uncorrected data signal applied to the first input of MUX 302. When a Single Bit Error (SBE) is detected, then the MC_XX_DATA signal is the corrected data signal applied to the second input of MUX 302 from the ECC checking and correcting circuit 304. The control logic function 306 applies a control signal to the MUX 302 when the Single Bit Error (SBE) is detected for the MUX to select the corrected data signal at the second MUX input.

Referring to FIGS. 4, 5, 6, 7, and 8 there are shown timing diagrams illustrating operation of the memory controller MMU 106 implementing methods for processor bus speculative data completion in accordance with the preferred embodiment. The following Table 2 provides a description of the illustrated signals of FIGS. 4-8 provided by the memory controller MMU 106.

Table 2 Signal Descriptions

FPVAL signal indicates that valid data will be flowing from Memory 108, a number of X cycles, such as sixteen (16) cycles after this signal is asserted.

FPSBE indicates whether or not a Single Bit Error (SBE), which is correctable, has occurred within the Memory Data. This signal is asserted in conjunction with the associated Memory Data.

FPKEY is an identifying tag associated with each cache line of Memory Data.

MC_XX_DATA is Data from the memory controller MMU 106 that is being sent to the Processor Bus logic 104. This data is usually the uncorrected memory data, but is switched to the corrected data as necessary, as shown and described with respect to in FIG. 3.

Q.OOD is a Processor Bus signal that is an identifying tag associated with the cache line of data.

Q.DRDY is a Processor Bus signal that indicates that valid data is being transferred on the processor bus. Note that this signal is asserted for two bus-clocks for every cache line of data transferred.

Q.DAT are the Processor Bus data signals.

Figure 4:
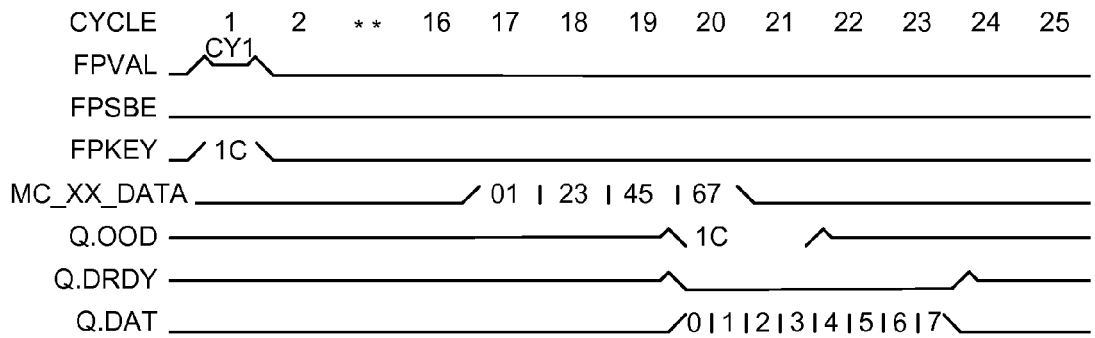
FIGS. 4, 5, 6, 7, and 8 are timing diagrams illustrating operation of the MMU of FIG. 3 implementing methods for processor bus speculative data completion in accordance with the preferred embodiment.

Referring now to FIG. 4, the respective above-described signals are shown for a memory read operation without a Single Bit Error (SBE). The Q.DRDY signal is asserted for two consecutive bus clocks with the Q.DAT processor bus data signals.

Figure 5:
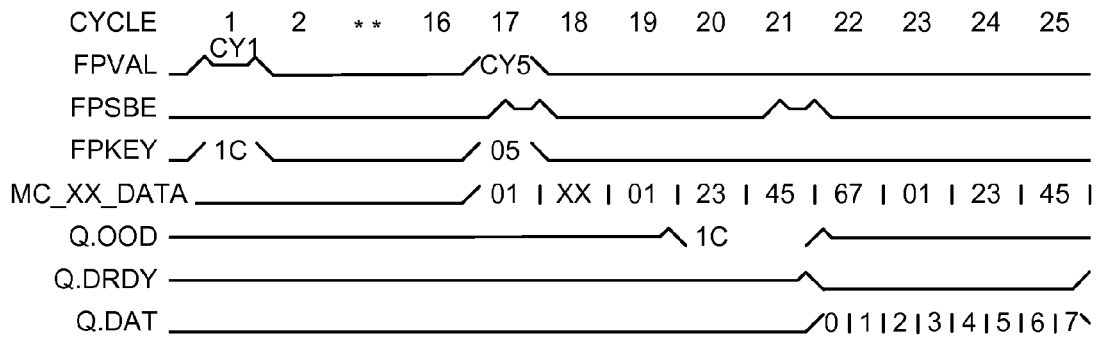

In FIG. 5, the respective above-described signals are shown for two memory reads with a Single Bit Error (SBE) in the first 16 bytes of the first memory read. The SBE in the first 16 bytes of the first memory read is indicated by XX within line representing the MC_XX_DATA data output of the memory controller MMU 106. The second FPSBE signal is asserted to indicate that a Single Bit Error (SBE) has occurred within the Memory Data and that the second transfer is from the ECC check and correct circuit 304. The Q.DRDY signal is asserted for two consecutive bus clocks with the Q.DAT processor bus data signals.

Figure 6:
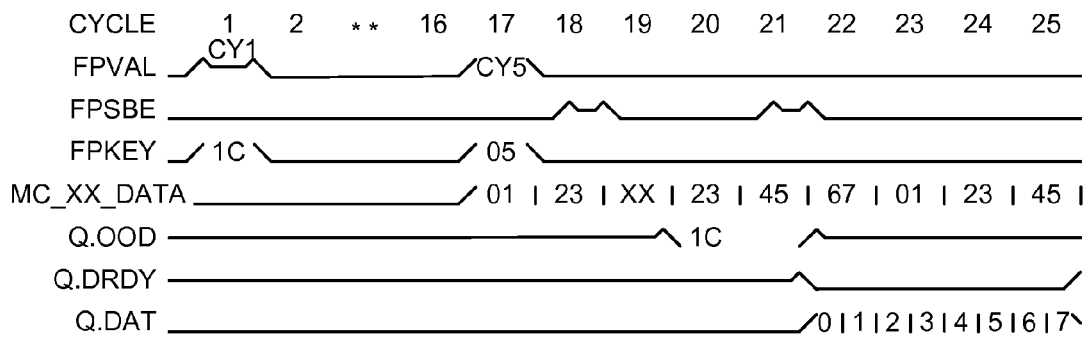

In FIG. 6, the respective above-described signals are shown for two memory reads with a Single Bit Error (SBE) in the second 16 bytes of the first memory read. The second FPSBE signal is asserted to indicate that the Single Bit Error (SBE) has occurred within the Memory Data and that the data transfer is from the ECC check and correct circuit 304. The Q.DRDY signal is asserted for two consecutive bus clocks with the Q.DAT processor bus data signals.

Figure 7:
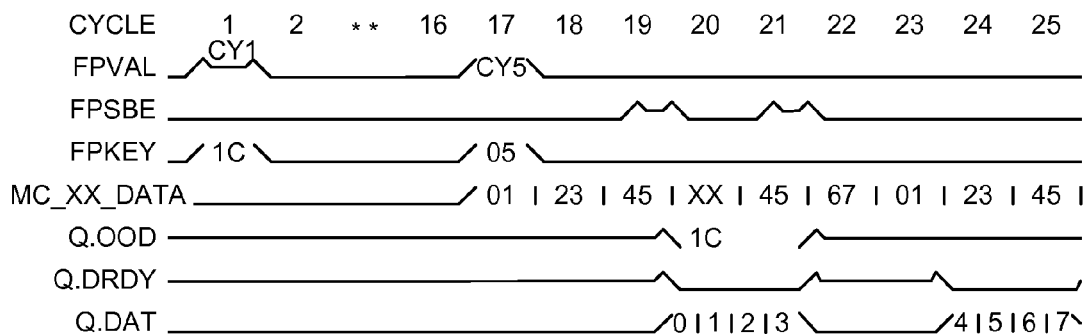

In FIG. 7, the respective above-described signals are shown for two memory reads with a Single Bit Error (SBE) in the third 16 bytes of the first memory read. The second FPSBE signal is asserted to indicate that the Single Bit Error (SBE) has occurred within the Memory Data and that the third transfer is from the ECC check and correct circuit 304. The Q.DRDY signal is asserted for two separated bus clocks for the valid Q.DAT processor bus data signals.

Figure 8:
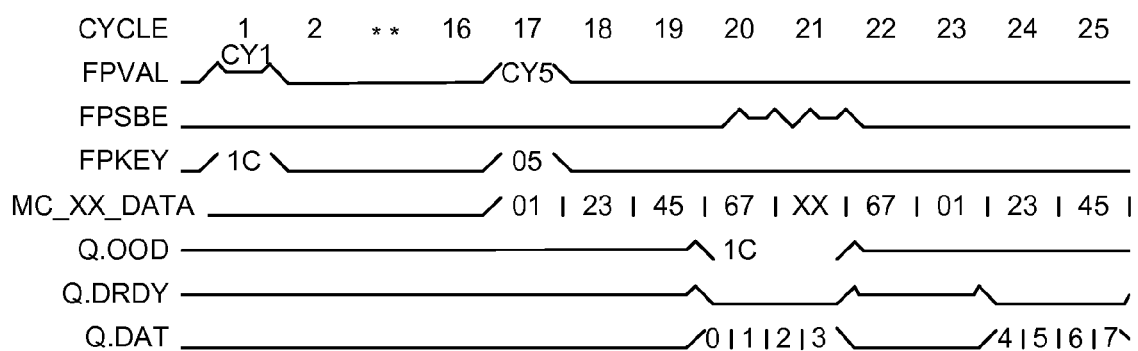

In FIG. 8, the respective above-described signals are shown for two memory reads with a Single Bit Error (SBE) in the fourth 16 bytes of the first memory read. The second FPSBE signal is asserted to indicate that the Single Bit Error (SBE) has occurred within the Memory Data and that the fourth transfer is from the ECC check and correct circuit 304. The Q.DRDY signal is asserted for two separated bus clocks for the valid Q.DAT processor bus data signals.

While the present invention has been described with reference to the details of the embodiments of the invention shown in the drawing, these details are not intended to limit the scope of the invention as claimed in the appended claims.

What is claimed is:

1. Apparatus for implementing processor bus speculative data completion in a computer system comprising:

a memory controller memory management unit (MMU) for implementing processor bus speculative data completion;

said memory controller MMU including a multiplexer, an error correcting code (ECC) checking and correcting circuit, and a control logic function;

said multiplexer having a first input for receiving uncorrected data from a memory and having a second input for receiving corrected data from said ECC checking and correcting circuit; said multiplexer having an output coupled to a processor bus;

said ECC checking and correcting circuit applying a detected error signal to the control logic function responsive to a Single Bit Error (SBE) being detected; and said control logic function coupled to said multiplexer for applying a select signal to said multiplexer responsive to said detected error signal for selecting a multiplexer output of said second input.

2. Apparatus for implementing processor bus speculative data completion as recited in claim 1 wherein the uncorrected data from the memory is coupled to said multiplexer output during normal operation.

3. Apparatus for implementing processor bus speculative data completion as recited in claim 1 wherein said multiplexer output includes processor bus signals applied to the processor bus.

4. Apparatus for implementing processor bus speculative data completion as recited in claim 1 wherein during normal operation said multiplexer sends uncorrected data to the processor bus for reducing latency of data transfers by at least one cycle.

5. Apparatus for implementing processor bus speculative data completion as recited in claim 1 wherein said multiplexer sends corrected data to the processor bus from said ECC checking and correcting circuit responsive to a Single Bit Error (SBE) being detected, said corrected data applied to the processor bus a predefined number of cycles after the uncorrected data having the Single Bit Error (SBE).

* * * * *